United States Patent [19]

Bennett

[11] Patent Number: 4,682,382
[45] Date of Patent: Jul. 28, 1987

[54] WEATHER SEAL FOR A LOADING DOCK PIT

[75] Inventor: Mark A. Bennett, Milwaukee, Wis.
[73] Assignee: Kelley Company Inc., Milwaukee, Wis.
[21] Appl. No.: 816,348
[22] Filed: Jan. 6, 1986
[51] Int. Cl.[4] .............................................. E01D 1/00
[52] U.S. Cl. ................... 14/71.3; 52/173 DS
[58] Field of Search .............. 14/71.1, 71.3, 71.5, 14/71.7; 49/485; 52/173 DS

[56] References Cited

U.S. PATENT DOCUMENTS

| | | | |
|---|---|---|---|
| 2,974,336 | 3/1961 | Kelley | 14/71.3 |
| 3,840,930 | 10/1974 | Wanddell | 14/71.3 |
| 4,293,969 | 10/1981 | Frommelt | 14/71.1 |
| 4,422,199 | 12/1983 | Frommelt | 14/71.3 X |
| 4,501,042 | 2/1985 | DiFonzo | 14/71.3 |
| 4,557,008 | 12/1985 | Jurden | 14/71.7 |

Primary Examiner—Stephen J. Novosad
Assistant Examiner—John F. Letchford
Attorney, Agent, or Firm—Andrus, Sceales, Starke & Sawall

[57] ABSTRACT

A sealing mechanism associated with a dockboard for providing a weather seal for the pit in the loading dock during a loading operation. The sealing mechanism includes a pair of guide tracks mounted on the vertical front face of the dock, and a frame is mounted for sliding movement on the guide tracks and is biased to an upward position. A flexible panel is carried by the frame and extends upwardly and outwardly in a position to be engaged by the rear end of a truck bed as a truck backs toward the loading dock for a loading operation. An operating rod extends upwardly from the frame and is positioned to be engaged by the ramp of the dockboard to thereby enable the panel to follow downward float of the truck bed during a loading operation. Engagement of the panel with the truck bed, along with the engagement of the sides of the panel with bumpers mounted on the loading dock, provide an effective weather seal for the pit area during the loading operation.

16 Claims, 4 Drawing Figures

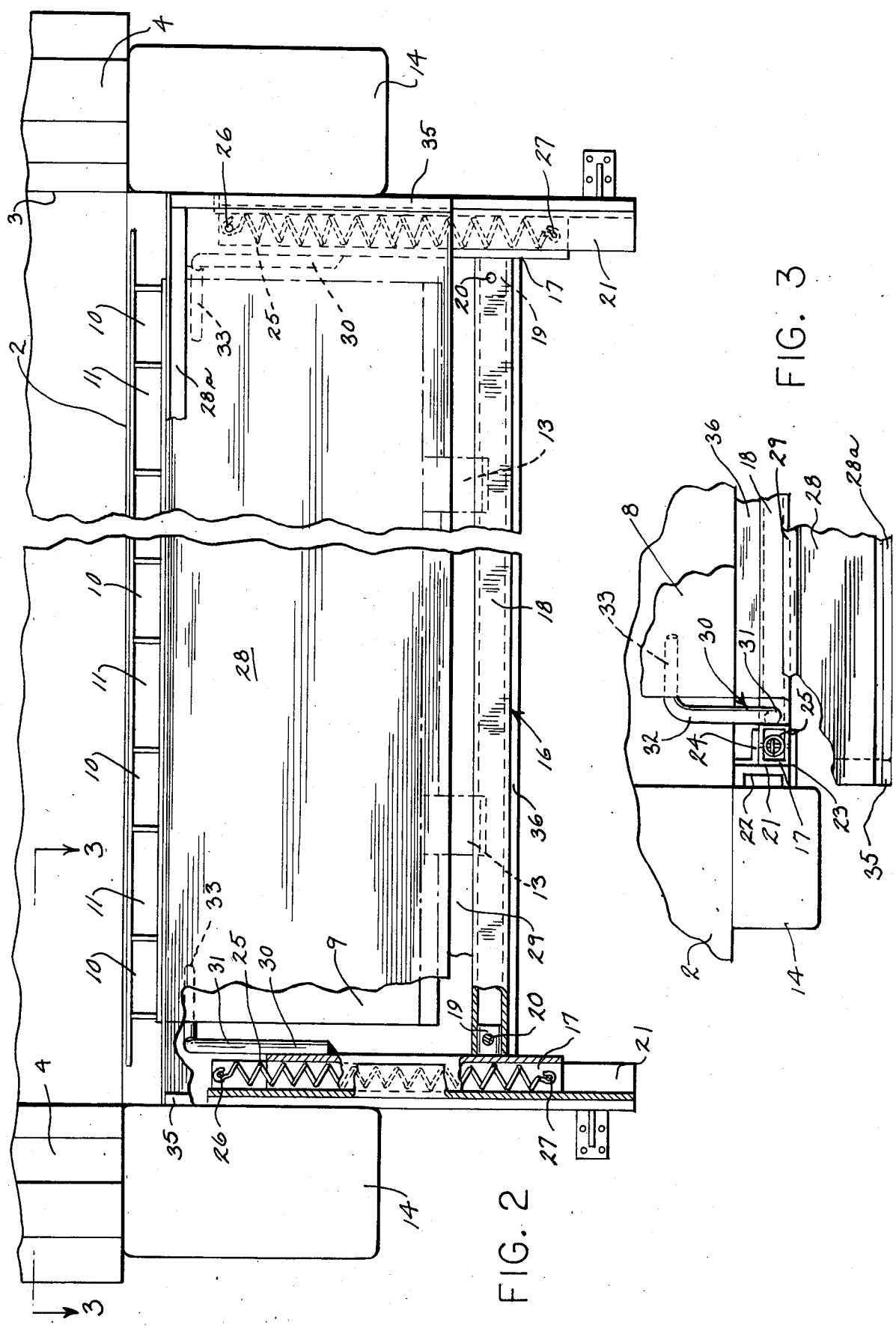

WEATHER SEAL FOR A LOADING DOCK PIT

BACKGROUND OF THE INVENTION

Dockboards are utilized in conjunction with a loading dock to span the gap between the dock and the bed of a truck parked in front of the dock, so that material handling equipment, such as a forklift truck, can travel between the dock and the truck bed.

One common form of dockboard is mounted in a pit or recess in the upper surface of the dock. A dockboard of this type, as disclosed in U.S. Pat. No. 4,068,338, includes a ramp or deck plate which is hinged at its rear edge to the dock and is movable between a generally horizontal storage position, where it is flush with the upper surface of the dock, to an upwardly inclined position. A lip is hinged to the forward edge of the ramp and can be pivoted between a downwardly hanging pendant position to an extended position where it forms an extension to the ramp and contacts the bed of the truck.

When the lip is extended and rests on a truck bed, the under surface of the ramp is exposed to the atmosphere. Under these conditions in a cold storage warehouse, the warm ambient air will contact the under surface of the ramp, while the upper surface of the ramp is exposed to the cool air of the warehouse, resulting in condensation on the under surface of the ramp and corrosion of the ramp and the working components of the dockboard.

Conversely, in extreme cold weather conditions, the under side of the ramp will be exposed to the cold ambient air, while the upper surface of the ramp will be exposed to the warmer air of the warehouse. Under these conditions substantial heat loss can occur through the pit area.

Also, and perhaps more importantly, hot or cold air is able to flow into the pit under the dockboard and up around the sides directly into the building, particularly in the case of a step type pit.

SUMMARY OF THE INVENTION

The invention is directed to a sealing mechanism associated with a dockboard for providing an effective weather seal for the pit area when the lip of the dockboard is extended during a loading operation. It also provides an effective seal when the lip is not extended, such as is the case during end loading operations.

The sealing mechanism includes a pair of guide tracks that are mounted on the front face of the dock and located inwardly of the bumpers which are positioned to be engaged by the rear of a truck as it backs toward the loading dock. A generally U-shaped frame is mounted for sliding movement in the guide tracks and the frame is biased to an upper position by a pair of springs. Mounted on the frame is a generally rectangular flexible panel which extends upwardly and outwardly from the frame. The upper edge of the panel is positioned to be engaged by the rear end of the truck bed as the truck backs toward the loading dock.

To properly position the panel with respect to the truck bed, an actuating member is connected to the frame and extends upwardly and rearwardly from the frame in position to be engaged by the ramp, when the ramp is in its operating position during a loading operation. The actuating member is also in engagement with the ramp when the lip is not extended and prevent interference during end loading operations. Engagement of the actuating member by the ramp will force the frame and panel downwardly against the force of the springs to properly locate the panel with respect to the truck bed.

Engagement of the upper edge of the panel with the truck bed, along with the engagement of the side edges of the panel with the dock bumpers, provides an effective weather seal for the pit area.

As the position of the panel is determined by the position of the ramp and truck bed, the panel will automatically follow upward and downward float of the truck bed during a loading operation. For example, if the truck bed is lowered, as by a load being applied to the truck bed, the ramp and extended lip will correspondingly lower, and lowering of the ramp will correspondingly lower the panel. Conversely, if the truck bed raises as a load is removed from the truck bed, the ramp will move upwardly and the springs will enable the panel to move upwardly with the ramp and truck bed. Thus, the panel will maintain its relative position with the truck bed during the upward and downward floating action.

The sealing mechanism is automatically actuated through operation of the dockboard so that no manual controls or operations are required.

Other objects and advantages will appear in the course of the following description.

DESCRIPTION OF THE DRAWINGS

The drawings illustrate the best mode presently contemplated of carrying out the invention.

In the drawings:

FIG. 2 is a front elevation of a structure shown in FIG. 1;

FIG. 3 is a horizontal section taken along line 3—3 of FIG. 2 and showing the guide track and frame.

DESCRIPTION OF THE ILLUSTRATED EMBODIMENT

Figure 1:
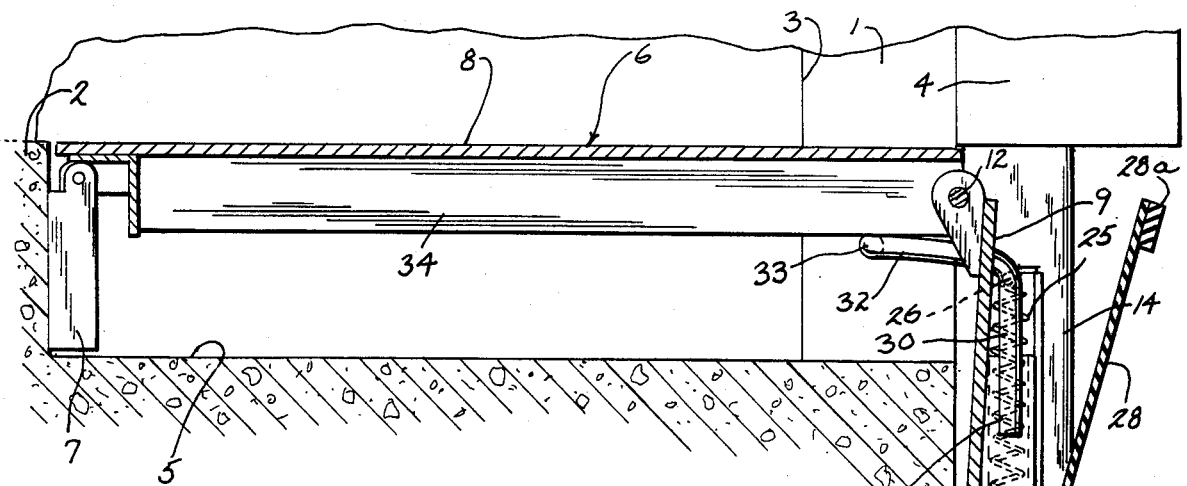
FIG. 1 is a vertical section of a loading dock having a pit mounted dockboard and incorporating the pit sealing mechanism of the invention.

The drawings illustrate a loading facility including a vertical wall 1 and a loading dock 2. Wall 1 is formed with a doorway 3 which is normally closed by an overhead door, not shown. A conventional dock seal or shelter 4 is mounted on the exterior of wall 1 around the sides and the top of the doorway and is adapted to be engaged by the rear end of a truck body, as the truck backs toward the loading dock. The seal 4 acts in a conventional manner to provide a weather seal between the end of the truck body and the wall 1.

Figure 4:
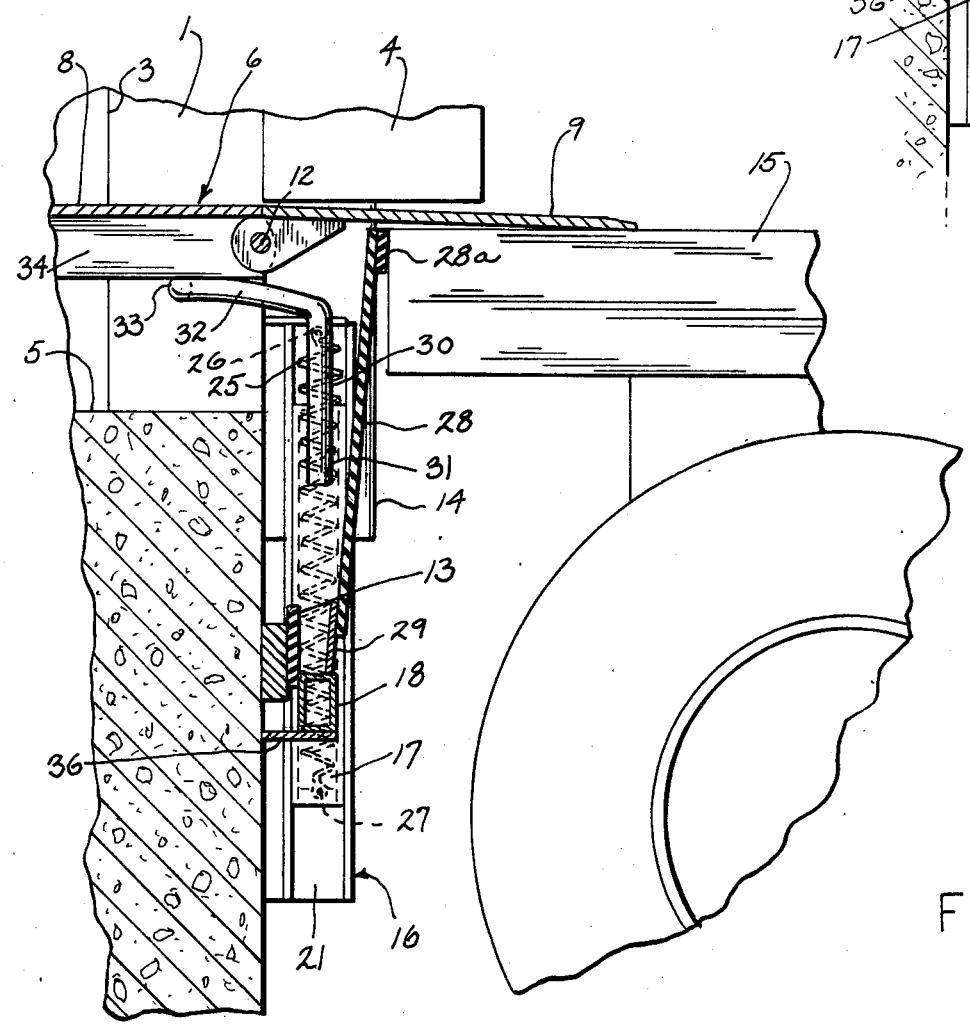
FIG. 4 is a view similar to FIG. 1 showing the panel in engagement with the truck bed to provide a seal for the pit area.

Located in the loading dock 2 beneath doorway 3 is a pit or recess 5, and a conventional dockboard 6 is mounted in the pit. Dockboard 6 can be a type as shown in U.S. Pat. No. 4,068,338, including a frame 7 mounted in pit 5, and a ramp or deck plate 8 is pivoted to the frame 7 at the rear end of pit 5 and can be moved in a conventional manner from a generally horizontal storage position to an upward inclined position by a hydraulic or mechanical mechanism, not shown. Hinged to the front edge of ramp 8 is a lip 9, and the lip is movable from a downwardly hanging pendant or storage position, as shown in FIG. 1 and an extended position, as illustrated in FIG. 4, where it forms an extension to the ramp and rests on the bed of a truck.

To provide the hinged connection between ramp 8 and lip 9, the lip is provided with a series of hinge tubes 10 which are aligned with hinge tubes 11 on ramp 7, and the hinge tubes are joined together by hinge pin 12.

In the pendant position, the lower edge of lip 9 is retained within a pair of saddles or keepers 13 which mounted on the front face of dock 2.

A pair of conventional resilient bumpers 14 are mounted on the front face of the dock 2 on either side of pit 5. When a truck backs toward the loading dock for a loading operation, bed 15 of the truck will engage bumpers 14. Dockboard 6 will then be actuated by an operator, causing ramp 8 to be pivoted upwardly to an inclined position. With ramp 8 in the inclined position, lip 9 will then be extended either as a consequence of the ramp moving upwardly or in some instances, as the ramp moved downwardly. With the lip 9 extended, ramp 8 is then pivoted downwardly, either by a workman walking outwardly on the ramp in the case of a mechanical dockboard, or by release of hydraulic pressure in the case of a hydraulic dockboard. Lowering of the ramp will cause the extended lip to come to rest on the truck bed 15, as illustrated in FIG. 4, thereby enabling material handling equipment to move from the dock to the truck bed.

In accordance with the invention, a mechanism is provided for sealing the pit area when the lip is extended and is resting on a truck bed during a loading operation and during end loading operations when the lip is not extended and the overhead door is open, creating a large gap between the face of the lip and the rear of the truck.

Under the conditions with the lip extended, the entire under side of the ramp will be exposed to the atmosphere. If the loading dock is associated with a cold storage warehouse, the under side of the ramp will be exposed to warm ambient air, while the upper surface of the ramp will be exposed to the cooler air of the cold storage facility. This can result in substantial heat transfer to the warehouse, as well as condensation on the under surface of the ramp which can cause corrosion of the ramp and the operating components. Further, air is able to flow into the pit under the dockboard and then upwardly along the sides of the dockboard into the building to adversely effect the temperature conditions in the building.

The pit sealing mechanism of the invention includes a generally U-shaped frame 16 composed of a pair of box-shaped side members 17 and a cross member 18 which connects the lower ends of the members 17. Lugs 19 extend inwardly from each side member and the ends of the cross members are pivotally connected to lugs 19 at pivots 20. The pivotal connection ensures that the frame can slide vertically relative to the dock without binding.

Frame 16 is mounted for vertical sliding movement within a pair of guide tracks 21 which are mounted on the front face of dock 2. Each guide track includes a channel 22, a plate 23, and an angle 24 which extend inwardly from the respective channel and define guide track 21 within which the side members slide.

Frame 16 is biased upwardly relative to the guide tracks by a pair of springs 25 which are mounted within the respective side members 17. One end of each spring 25 is connected to a pin 26 which extends across the upper end of the guide track 21, while the opposite end of the spring is connected to pin 27 that is mounted in the lower end of side member 17. With this construction, the extension springs 25 will urge the frame 16 upwardly relative to the guide tracks 21.

A flexible, generally rectangular panel 28 is mounted to cross member 18 through a strip 29. As shown in FIG. 1, panel 28 extends upwardly and outwardly from the loading dock, and the upper portion of the panel is adapted to be engaged by the truck bed 15 as the truck backs toward the loading dock. A resilient sealing strip 28a, such as a fabric covered foam pad, can be mounted along the top outside edge of panel 28 to aid in conforming to irregularities in the rear of the truck bed.

As the vertical height of the truck bed 15 may vary considerably from truck to truck, a mechanism can be incorporated to properly position panel 28 relative to the truck bed and to maintain that relationship as the truck bed raises and/or lowers during a loading operation. In this regard, a rod 30 is secured to the outer surfaces of each of the side members 17 and each rod 30 includes a vertical section 31 that extends upwardly from side member 17, a horizontal section 32 that extends inwardly over the pit, and a second horizontal section 33 that extends toward the center line of the pit away from the guide track 21.

Rods 30 are adapted to be engaged by beams 34 on the under surface of ramp 7 of dockboard 5. Engagement of the ramp with rods 30 will force the rods and frame 16 downwardly against the force of springs 25. When the ramp is in its horizontal position, the springs 25 will only be partially extended so that the frame 16 can move both upwardly and downwardly from that position.

The side edges of panel 28 are provided with flexible loops 35 which are adapted to engage the respective bumpers 14. Loops 35 provide a weather seal between panel 28 and bumpers 14 and also permit the panel to slide relative to the bumpers.

A flexible flap 36 is connected to the lower surface of cross member 18 and is adapted to ride against the front face of the dock 2 as the frame 16 moves relative to the dock. The strip 36 provides a weather seal at this joint, and being flexible, also permits water and debris to escape.

In the storage position of the dockboard, beams 34 on the ramp will be in engagement with the rods 30, thereby partially extending springs 25. In this storage position as shown in FIG. 1, the lip is pendant and the lower edge of the lip is held by the saddles 13 so that the lip itself will provide a weather seal for the pit area. In this storage position, panel 28 extends upwardly and outwardly beyond the front face of bumpers 14.

When a truck backs toward the loading dock, the bed 15 of the truck will engage the panel 28, deflecting the panel inwardly until the end of the truck bed engages bumpers 14. A seal is provided at this point so that when the overhead door is opened, no gaps exist that permit outside air exchange, even before the lip is extended.

The dockboard is then operated causing the ramp to be elevated, and the lip will then be moved to its extended position. By lowering the ramp, the lip will then be brought into engagement with the truck bed, and the beams 34 on the ramp 8 will engage the actuating rods to move the frame 16 downwardly against the force of springs 25 and correspondingly move the panel downwardly. As the position of frame 16 and panel 28 are determined by the position of the ramp 8, the panel will be precisely positioned relative to the truck bed 15, regardless of the height of the truck bed.

During the loading operation, the truck bed 15 may rise and fall, and this vertical float will be accommodated due to the engagement of the ramp with the operating rods 30. As the truck bed 15 rises and falls, the ramp 8 will correspondingly rise and fall to thereby move the panel 28. Thus, the panel 28 will maintain its relative position with respect to the truck bed during the floating action of the bed.

Various modes of carrying out the invention are contemplated as being within the scope of the following claims particularly pointing out and distinctly claiming the subject matter which is regarded as the invention.

I claim:

1. A weather seal associated with a dockboard mounted in a pit of a loading dock, said dock having a front vertical face disposed beneath said pit, said dockboard including a ramp having a rear end hinged to said dock and also including a lip hinged to the forward end of said ramp and movable between a downwardly hanging pendant position and an extended position, said weather seal comprising guide means disposed on the front face of the loading dock, a frame mounted for vertical movement in said guide means, biasing means connected to said frame for biasing the frame to an upper position, a substantially rigid self-supporting panel connected to the frame for flexing movement in a direction toward and away from said dock face and having a portion disposed to be engaged by the bed of a vehicle as the vehicle backs toward the loading dock, and actuating means operably connected to the frame and disposed to be engaged by the dockboard for moving the frame and panel downwardly against the force of said biasing means, said panel providing a seal for the pit.

2. The weather seal of claim 1, wherein said panel is generally rectangular in shape and extends upwardly from said frame and outwardly from said dock.

3. The weather seal of claim 1, wherein said actuating means includes an actuating member extending upwardly and rearwardly from said frame to a location within said pit.

4. A weather seal associated with a dockboard mounted in a pit of a loading dock, said dockboard including a ramp having a rear end hinged to said dock and also including a lip hinged to the forward end of said ramp and movable between a downwardly hanging pendant position and an extended position, said weather seal comprising guide means mounted on a front face of the dock, a frame mounted for vertical movement on said guide means, biasing means for biasing the frame to an upper position, a flexible panel connected to the frame and extending upwardly and outwardly from the frame and having an upper portion disposed to be engaged by the bed of a truck as the truck backs toward the loading dock, and means responsive to vertical floating movement of the truck bed for moving said panel vertically to accommodate said float.

5. The weather seal of claim 4, wherein said means responsive to vertical floating movement comprises an actuating member extending upwardly from said frame and disposed to be engaged by said ramp to thereby move said frame downwardly in said guide means against the force of said biasing means.

6. In combination, a loading facility including a loading dock and having a vertical wall defining a doorway, said loading dock having a pit aligned with said doorway, a dockboard disposed in said pit and including a ramp having a rear end hinged to the loading dock and movable between a generally horizontal cross traffic position and an upwardly inclined position, said dockboard also including a lip hinged to the forward end of said ramp and movable between a downwardly hanging pendant position and an outwardly extending position where said lip forms an extension to said ramp, sealing means disposed on the exterior of said wall and bordering the sides and top of said doorway, said sealing means being disposed to be engaged by the rear portion of a truck body parked in front of said loading dock to provide a weather seal between said wall and the truck body, and pit sealing means for sealing the forward end of the pit when the lip is in an extended position, said pit sealing means comprising guide means mounted on the front face of the loading dock, a frame mounted for sliding vertical movement in said guide means, biasing means for biasing the frame to an upper position, a flexible panel carried by the frame and disposed to be engaged by the bed of said truck as the truck backs toward said loading dock, and means responsive to vertical floating movement of the truck bed during a loading operation for moving said panel vertically to accommodate said floating movement.

7. The combination of claim 6, and including a pair of bumpers mounted on the front face of said loading dock and disposed outwardly of the respective guide means, said bumpers being disposed to be engaged by the bed of a truck.

8. The combination of claim 7, and including a flexible strip mounted on each side edge of said panel and disposed to engage the respective bumpers.

9. The combination of claim 7, wherein said for moving said panel vertically means comprises an actuating member extending upwardly from said frame and having an upper end portion disposed to be engaged by said ramp.

10. The combination of claim 9, wherein said upper end portion is disposed above said pit.

11. The combination of claim 7, wherein said frame includes a pair of spaced vertical side members disposed to slide in said guide means and a cross member connecting said side members, the lower portion of said panel being connected to said cross member.

12. In combination, a loading dock having a generally horizontal dock surface and having a vertical wall defining a doorway, said dock also including a pit disposed behind said doorway in said loading surface, a pair of bumpers mounted in spaced relation on said wall in position to be engaged by a truck backing toward said dock, a dockboard mounted in said pit and including a ramp having a rear end hinged to said dock and also including a lip hinged to the forward end of said ramp and movable between a downwardly hanging pendant position and an extended position, mounting means disposed on said wall beneath said pit, and a panel connected to the mounting means and extending upwardly from said mounting means and outwardly from said wall, the upper portion of said panel normally positioned a greater distance from said wall than said bumpers and disposed to be engaged by the rear end of the bed of a truck as said truck backs toward said dock, the side edges of said panel being disposed in engagement with the respective bumpers, engagement of the upper portion of said panel with said truck bed and engagement of said side edges with said bumpers providing a weather seal for said pit.

13. The combination of claim 12, and including flexible sealing strips mounted on said side edges and disposed to ride against said bumpers.

14. The combination of claim 12, wherein said panel is constructed and arranged to flex in a direction toward said wall when engaged by said truck bed.

15. In combination, a loading dock having a generally horizontal dock surface and having a vertical wall defining a doorway, said dock also including a pit disposed behind said doorway in said loading surface, a pair of bumpers mounted in spaced relation on said wall in position to be engaged by a truck backing toward said dock, a dockboard mounted in said pit and including a ramp having a rear end hinged to said dock and also including a lip hinged to the forward end of said ramp and movable between a downwardly hanging pendant position and an extended position, a sealing member disposed outwardly of said wall and beneath said pit, at least a portion of said sealing member being normally positioned a greater distance outwardly from said wall than said bumpers and disposed to be engaged by the rear end of a truck as said truck backs toward said dock to thereby aid in providing a weather seal for said pit.

16. In combination a loading dock having a horizontal loading surface with a pit formed therein, said dock also including a generally vertical front face located beneath said pit, a dockboard disposed in said pit and including a ramp having a rear end hinged to the loading dock and movable between a generally horizontal cross traffic position and an upwardly inclined position, said dockboard also including a lip hinged to the forward end of the ramp and movable between a downwardly hanging pendant position and an outwardly extending position where said lip forms an extension to said ramp, sealing means for sealing the forward end of the pit when the lip is in an extended position, said sealing means including a substantially rigid self-supporting sealing member having a width at least equal to the width of said pit, means for mounting the sealing member for vertical movement on said front face, said sealing member having an inoperative positon wherein said sealing member extends upwardly and outwardly from said front face in position to be engaged by a vehicle backing toward said dock, said sealing member being constructed and arranged to flex in a direction toward said loading dock to a generally vertical sealing position on contact by said vehicle, the upper edge of said sealing member when in said sealing position being located at a level approximately equal to the level of said ramp, and means responsive to vertical movement of said ramp for maintaining the upper edge of said sealing member at a level approximately equal to the level of the ramp.

* * * * *

UNITED STATES PATENT AND TRADEMARK OFFICE
CERTIFICATE OF CORRECTION

PATENT NO. : 4,682,382
DATED : July 28, 1987
INVENTOR(S) : MARK A. BENNETT

It is certified that error appears in the above-identified patent and that said Letters Patent is hereby corrected as shown below:

Col. 6, CLAIM 9, Line 34, After "said" delete "for mov-"
Col. 6, CLAIM 9, Line 35, Delete "ing said panel vertically"
Col. 6, CLAIM 9, Line 36, After "means" insert ---for moving said panel vertically---

Signed and Sealed this

Twenty-ninth Day of November, 1988

Attest:

DONALD J. QUIGG

Attesting Officer

Commissioner of Patents and Trademarks